United States Patent [19]
Pekau

[11] 3,805,222
[45] Apr. 16, 1974

[54] METHOD FOR THE PRODUCTION OF HIGHLY-RESOLVED SONAR PICTURES

[75] Inventor: Dietlind Pekau, Krailling, Germany

[73] Assignee: Siemens Aktiengesellschaft, Berlin and Munich, Germany

[22] Filed: Apr. 7, 1971

[21] Appl. No.: 148,268

[30] Foreign Application Priority Data
Apr. 27, 1970 Germany............................ 2020566

[52] U.S. Cl................. 340/3 R, 340/5 H, 343/5 PC
[51] Int. Cl.................................................. G01s 9/66
[58] Field of Search................. 340/3 R, 5 H, 5 MP; 343/5 CM, 5 PC

[56] References Cited
UNITED STATES PATENTS
| | | | |
|---|---|---|---|
| 3,484,737 | 12/1969 | Walsh | 340/3 R |
| 3,569,967 | 3/1971 | Gendreu et al. | 343/5 CM |
| 3,461,420 | 8/1969 | Silverman | 340/5 H |

*Primary Examiner*—Richard A. Farley
*Attorney, Agent, or Firm*—Hill, Sherman, Meroni, Gross & Simpson

[57] ABSTRACT

A method for producing highly-resolved sonar pictures by sending out coherent ultrasonic waves and receiving the returning echo signals on a ship which is preferably moving, with the aid of sound transducers which are arranged in a line parallel to the azimuth direction, wherein both phase information and the amplitude information of the echo signals which are received by the sound transducers are recorded through the utilization of a reference signal as a function of the reception time on parallel straight lines which are inclined with regard to the target-distance coordinate axis in accordance with the speed of movement of the ship.

12 Claims, 6 Drawing Figures

METHOD FOR THE PRODUCTION OF HIGHLY-RESOLVED SONAR PICTURES

BACKGROUND OF THE INVENTION

1. Field of the Invention

This invention relates to a method for producing highly-resolved sonar pictures by transmitting coherent ultrasonic waves and receiving returning echo signals on a moving ship and with the aid of a line of sound transducers which are spaced along the line, which sound transducers may be scanned in sequence for recording each sonar impulse by way of an oscillograph on a moving photo sensitive material.

2. Description of the Prior Art

Ultrasonic frequencies in the range of 100 kHz are utilized in order to make under water objects visible at distances in the range of kilometers. Higher ultrasonic frequencies are generally not applicable for this purpose due to the absorption thereof over long distances. On the other hand, the resolving power is proportional to the ultrasonic wavelength, so that large receiving apertures are required, in view of the relatively high wavelength of lower frequencies, to obtain a high resolving power. In order to obtain sufficient resolving power, a correspondingly large aperture would have to be produced from a large number of sound transducers in a matrix arrangement. In view of the large number of sound transducers needed for such a matrix, such an aperture does not seem to be economically realizable.

The primary object of the present invention is to provide a method which allows one to obtain a large aperture synthetically and to obtain a high resolving power with the aid of such an aperture. The invention therefore proceeds from the prior art principle of side-looking radar wherein a series of radar impulses is transmitted laterally from an antenna carried on board an airplane. A coherent reference signal which is taken from the transmitter is superimposed over the echos received by this antenna. The interference signal thus occurring is recorded on an oscillograph screen after the transformation thereof into a video signal, whereby each radar impulse has a vertical beam track assigned thereto. This beam track is recorded on a film which is pulled along the oscillograph picture screen in a horizontal direction. The target distance is recorded on the film in the vertical direction by the application of pulse compression technique, in a conventional manner, while aximuthal target coordinates are registered for each distance range in the form of one dimensional holograms in the horizontal film direction. The azimuthal target information can be obtained by illuminating the hologram with a laser; however, the target distance and the azimuthal target coordinates are focused in different planes, namely the target distance in the film plane and the azimuthal target coordinates in the reconstruction plane of each one-dimensional hologram. In the magazine "Proceedings of the IEEE," Vol. 54, No. 8, Aug. 1966, pages 1026–1032, a method has been described by Cutrona, Leith, Procello and Vivien, for which both planes are superimposed through the application of aspherical lenses. Therefore, all reconstruction planes of the one-dimensional holograms are imaged at infinity with the aid of a conical lens, while the target distance is also imaged at infinity by means of a cylindrical lens. Then all target points are brought from infinity into the focal plane of this lens with the help of a spherical lens. In this focal plane, the highly resolved radar map of the entire target range seized by the synthetic antenna is provided.

An application of the principle side-looking radar for obtaining highly-resolved sonar pictures which are taken from a traveling ship, however, is not possible in view of the low velocity of acoustic waves. If, for example, a ship speed of about 30 km/hour is assumed, the ship moves about 20 m before a sonar echo signal is received from a target distance of 1,500 m. Thus, the azimuth information would be scanned only every 20 m which would exclude a reconstruction of the target.

SUMMARY OF THE INVENTION

This invention therefore has as its primary object a method of providing sonar pictures, and more particularly to such a method which allows the recording of such pictures from a traveling ship.

According to the invention, the foregoing objectives are accomplished through a method similar to that mentioned above, wherein the echo signals are received by a number of sound transducers which are arranged in a line parallel to the azimuth direction, and the signals which are received by the sound transducers and which are superimposed with a coherent signal taken from the sound transmitter are recorded as a function of the reception time on parallel straight lines which are inclined with respect to the target-distance coordinate axis, depending on the traveling speed of the ship, and sonar map is reconstructed from the hologram thus obtained by means of illumination with a coherent light beam.

The length of the sound-transducer line shall be at least $4 \times (V_{ship}/V_{sound}) \times R$, where $V_{ship}$ and $V_{sound}$ are the ship and sound velocities and R the target distance. If, for instance, the ship speed is 15 km/h and the target distance 1.5 km, the length of the line of sound transducers will be 20 m. The sound transducers of one line can be arranged spaced apart at equal distances from one another or statistically distributed in a way that the number of sound transducers required is decreased and held to a minumum.

According to one embodiment of the invention, the recording of the single dimension acoustic holograms is effected in a way that the output signal of each sound transducer which is superimposed upon the reference signal is applied to each one of a series of controllable light sources, such as a light bulb or a luminescent diode, which are placed on a straight line and which are recorded on a light-sensitive material which is pulled along this line of light sources in both coordinate directions, whereby the speed of movement in the azimuth direction is proportional to the speed of the ship, while the speed of movement in the direction vertical to the azimuth direction is constant during the reception of the echo signals of an ultrasonic impulse and the light-sensitive material is returned to its original position in this direction until such time as the first echo of the sound impulse is received.

In place of the aforementioned parallel scanning of the individual ultrasonic transducers, a serial scanning may be effected in a manner that the individual ultrasonic transducers are scanned one after the other and aximuth information and distance information are recorded on the picture screen of an oscillograph for each sonar impulse, and recorded on the light-sensitive material which is pulled along the oscillograph screen parallel to azimuth direction at a speed proportional to the speed of the ship. If the scanning frequency is selected larger than the ultrasonic frequency, phase and amplitude of the signal are recorded simultaneously. In this case, the superposition of a coherent reference signal can be eliminated. Common photographic material may be utilized as the light-sensitive material or a reversible photochromic material may be employed which allows a real-time construction.

For the reconstruction of the sonar pictures, the hologram is illuminated by a coherent light beam, so that the sonar picture can be imaged with a conical lens, a cylindrical lens and a spherical lens. The application of a conical lens which introduces aberrations and distortions during the recording process can be avoided if the enlargement or demagnification (reduction) of each hologram is selected inversely proportional to $\sqrt{R}$ for each distance R in the azimuth direction during the recording of the hologram. In this case the reconstruction of each of the one-dimensional holograms occur in a single plane instead of in different planes, as in the preceding case, during the illumination of holograms with a laser beam so that this plane can be superimposed on the film plane through the utilization of a cylinder lens. If the variation of the object distance is small when compared to the object distance, a hologram demagnification can be selected which varies linearly as a function of the target distance.

While the resolving power with normal sonar which is determined by the smallest magnitude still resolvable is determined by the equation $\Delta x = 1.2 \times R \times \Lambda / D$, wherein R is the distance of object, $\Lambda$ the acoustic wavelength, and D the receiving aperture, the maximum possible diameter of the single dimension holograms will take the place of the aperture according to the method of the present invention, which is equal to about twice the radiated target surface, i.e. $D \approx 2 \Lambda \times R/a$, wherein $a$ is the diameter of the sound transmitter. $\Delta x$ here is therefore about equal to one-half the diameter of the sound transmitter and is thus independent of the target distance.

As opposed to side-looking radar, where the azimuth information is obtained in the form of single dimensional holograms point by point, each hologram in this invention is comprises of several sub-holograms with an aperture equal to the length of the transducer series. Since the recording time of each of the individual sub-holograms is very short, moving objects too can be recorded with the proposed system. However, then the azimuth resolving power is limited by the aperture of the individual sub-holograms.

BRIEF DESCRIPTION OF THE DRAWINGS

Other objects, features and advantages of the invention will be best understood from the following detailed description taken in conjunction with the accompanying drawings, in which.

DESCRIPTION OF THE PREFERRED EMBODIMENTS

Figure 1:
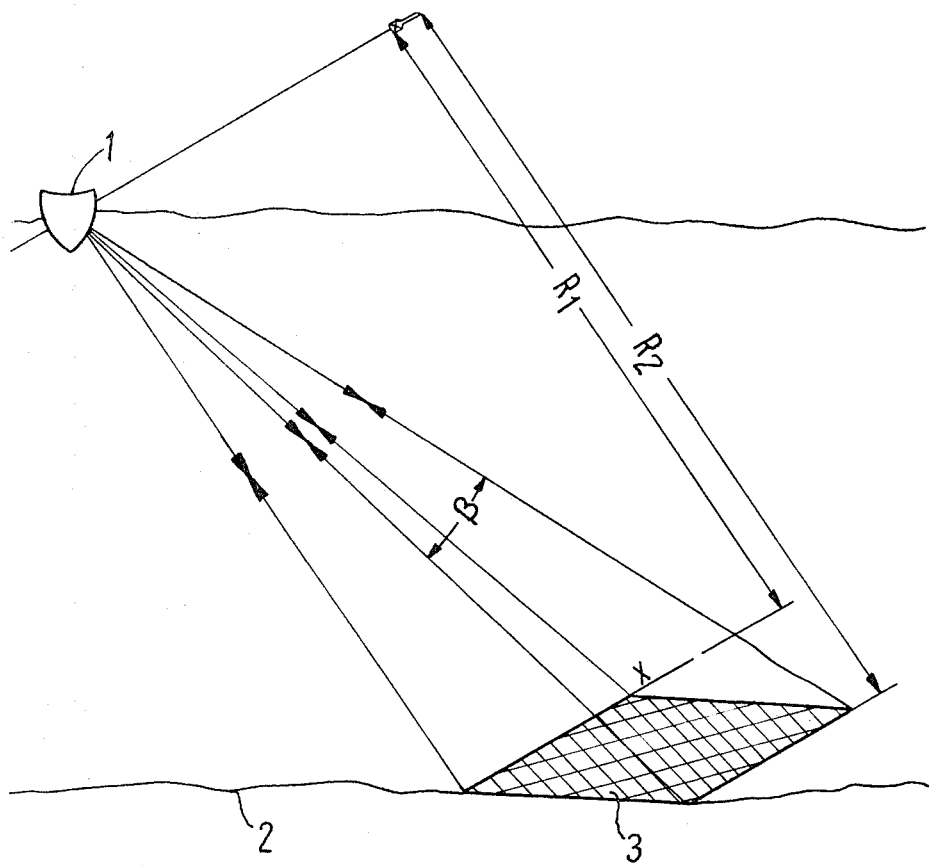
FIG. 1 is a diagrammatic sketch of a ship which employs a sonar system based on the principles of the present invention.

In FIG. 1, a ship 1 is illustrated which carries an ultrasonic transmitter which radiates ultrasonic waves under an aperture angle $\beta$, which are reflected by the bottom of the ocean 2 in the range of a target surface 3 which is being radiated and which has a distance $R_1$ through $R_2$ from the ship 1.

Figure 2:
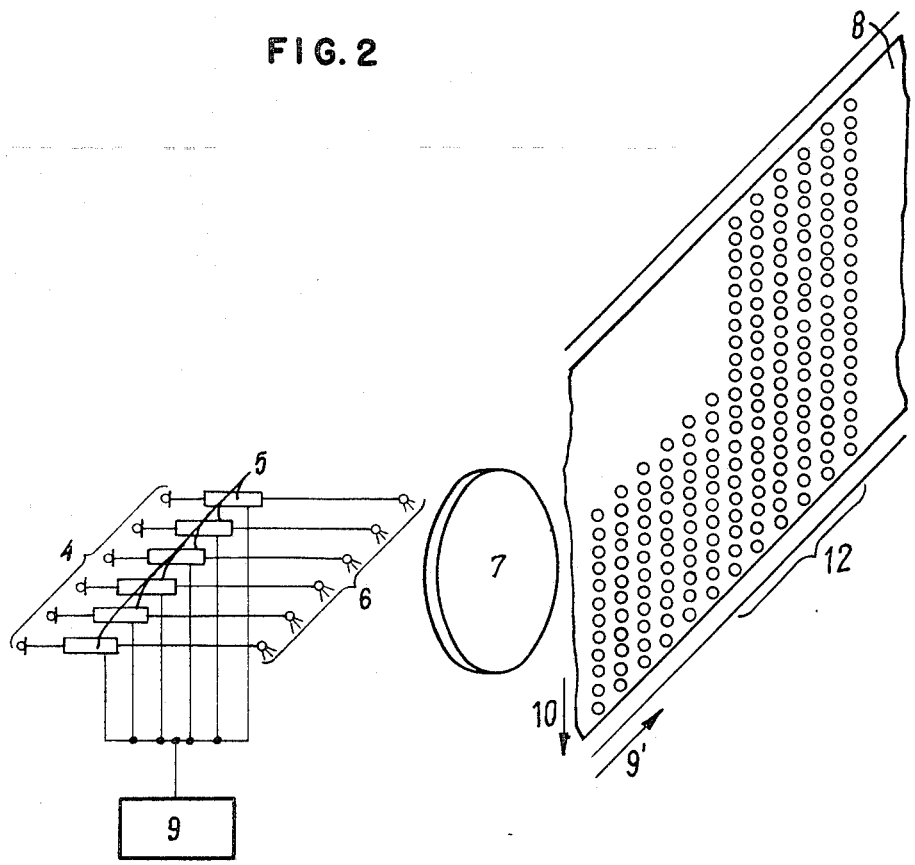
FIG. 2 illustrates an arrangement for the recording of sonar echo.

FIG. 2 illustrates a line of sound transducers 4 with output signals which control light sources 6 by way of mixing stages 5 which are provided with a coherent reference signal from the transmitter 9. The sources 6 are imaged on a photographic film 8 by way of a lens 7 and the photographic film is moved in the direction of the arrow 9' which corresponds to the azimuth direction and is proportional to the speed of the ship, and simultaneously moved in the direction of an arrow 10 during the transmission of an ultrasonic impulse at a constant speed, and then returned to its original position. It is therefore here illustrated that the recordation of the light sources 6 provide picture tracks 11 on the film 8. The group of picture tracks which is embraced by the bracket 12 stems form the echo signals of the preceding ultrasonic impulse in this figure.

Figure 3:
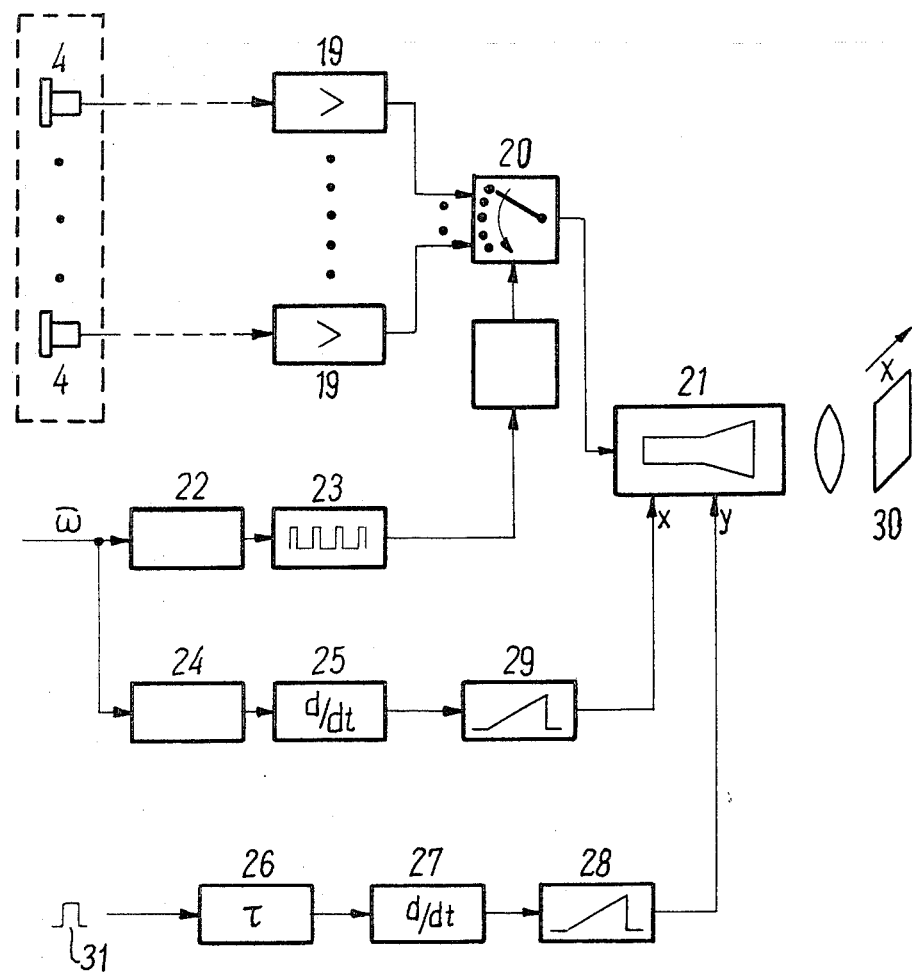
FIG. 3 illustrates another arrangement for the recording of sonar echo.

FIG. 3 shows an arrangement for the serial scanning of the sound transducers 4. The signals of each sound transducer 4 are scanned in serial by a shift or stepping register 20 after the reception and amplification in amplifiers 19, and are used to modulate the brightness of an oscillograph picture screen 21. The register 20 is controlled with a series of square impulses which are obtained from the reference signal of the frequency $\bar{\omega}$ by means of the frequency multiplier 22 and a pulse former 23, whereby the frequency $\bar{\omega}$ is equal to the ultrasonic frequency.

The x deflection of the oscillograph 21 is synchronized with the scanning control by simultaneously producing a saw tooth wave as a trigger for the control of the x deflection circuit 29 of the oscillograph 21 with a Schmitt trigger 24 from the reference signal by way of a differentiator 25. For the y deflection (distance coordinate) of the oscillograph 21, the transmission impulse 31 is delayed by means of a delay member 26 for a period of time $\tau$ from the transmission of the sonar impulse, and a trigger for the control of the y deflection circuit 28 is obtained by means of the differentiator 27. The series of one-dimensional holograms which are recorded on the oscillograph picture screen 21 are recorded on a film 30 which is pulled along the oscillograph 21 parallel to the x coordinate with a speed that is proportional to the speed of the ship.

Figure 4:
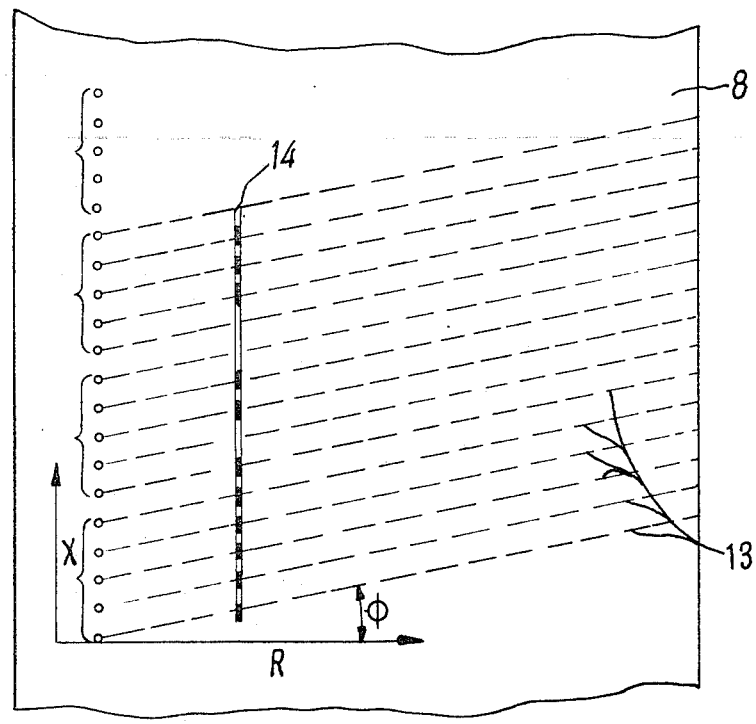
FIG. 4 is an illustration of the recorded sonar echo.

In FIG. 4, the record which is produced with the help of the arrangement according to FIG. 2 or in another manner such as by scanning in series of the sound transformers 4 according to FIG. 3 is illustrated in more detail. The broken lines 13 which run across the band direction correspond to the recordation of the echos which are recorded from respective sound transducers. The signal of a transducer thus corresponds to a straight line extending at an angle $\phi$ to the target-distance coordinate axis R, with a constant speed of the ship, whereby $\phi = K (V_{ship}/V_{sound})$, wherein $K$ is a constant. In the example illustrated in FIG. 4, a group of five such straight lines represents the signals of a line of sound tranducers, while the following group of five signals respectively stem from the preceding ultrasonic impulses. The coordinate which is transverse of the band direction corresponds to the distance R. For each distance R, single dimension holograms 14 of the echo signals are recorded in the direction of the band.

Figure 5:
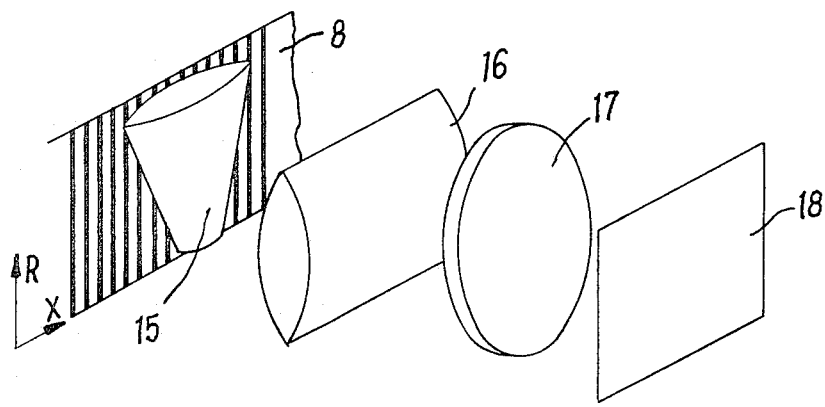
FIG. 5 illustrates an arrangement for the coherent optical production of sonar pictures from the recorded hologram.

The optical arrangement which is illustrated in FIG. 5 and which is common in the field of side-looking radar, can also serve for the reconstruction of sonar pictures from the hologram. The reconstruction planes of the holograms which are recorded on the film band 8 are recorded with the help of a conical lens 15 at infinity, while the film plane is also recorded at infinity through a cylinder lens 16. After this, the target points are brought into the focal plane 18 of the lens in which the highly-resolved sonar map is produced with the aid of a spherical lens 17.

Figure 6:
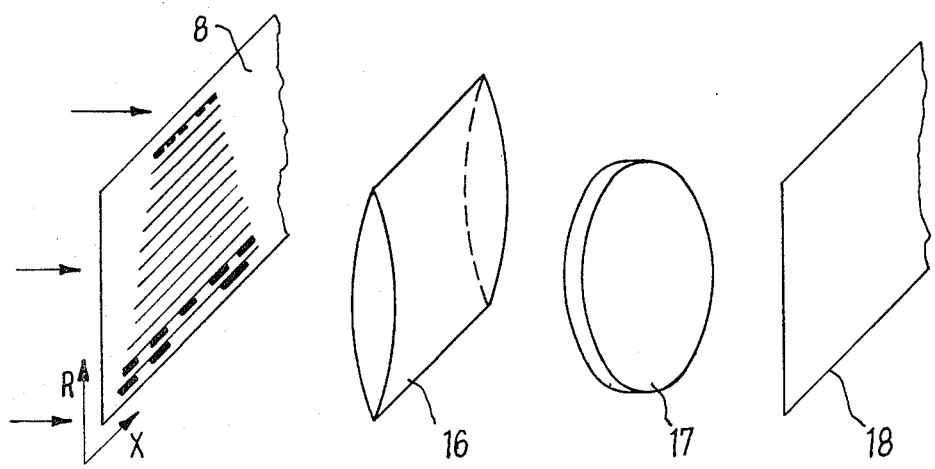
FIG. 6 shows a variation of the arrangement according to FIG. 5.

FIG. 6 illustrates an an arrangement for the recording of a sonar map with varying hologram demagnification which can be effected for instance by influencing the oscillograph deflection in $x$ direction as a function of time, or by the application of a conical lens during the recording of the signals onto the film. The holograms which are recorded in a way that the demaginfication of each one-dimensional hologram is inversely proportional to the square root of the corresponding target distance R, are illuminated with coherent light. The distance coordinate of the film plane is recorded with the combination of a cylinder lens 16 and a spherical lens 17 at the picture plane 18 of the sonar map, while the spherical lens 17 records the reconstruction plane 8 of the one-dimensional holograms at the picture plane.

While I have described my invention by reference to certain illustrative embodiments thereof, many changes and modifications may be made in the invention by one skilled in the art without departing from the spirit and scope thereof, and it is to be understood that I intend to include within the patent warranted hereon all such changes and modifications as may reasonably and properly be included within the scope of my contribution to the art.

What I claim is:

1. A method of producing highly resolved pictures by transmitting coherent ultrasonic waves and receiving echo signals on a moving ship, comprising the steps of receiving with sound transducers a plurality of echo signals along lines parallel to the azimuth direction of a target, and recording the phase and amplitude information of the received echo signals on straight parallel lines which are inclined with respect to the target distance coordinate axis in accordance with the speed of the ship, the step of receiving echo signals being further defined as receiving echo signals along a line of sound transducers having a length which is at least $$4 \times (V_{ship}/V_{sound}) \times R$$

where $V_{ship}$ is the speed of the ship, $V_{sound}$ is the speed of the sound wave and R is the target distance.

2. A method according to claim 1, wherein the step of receiving echo signals is further defined as receiving echo signals at equally spaced locations along a line parallel to the azimuth direction of the target.

3. A method according to claim 1, comprising the step of statistically distributing the sound transducers to minimize the number of transducers required.

4. A method according to claim 1, comprising the step of serially scanning the sound transducers, moving a light-sensitive material across the screen of an oscillograph and recording on the screen of the oscillograph and thereby on the light-sensitive material the azimuth and distance information of each sonar pulse received and scanned.

5. A method according to claim 4, wherein said step of scanning is further defined as scanning at a frequency greater than the frequency of the ultrasonic wave.

6. A method according to claim 4, comprising the step of mixing a coherent signal with the output signals of the sound transducers to record the phase and amplitudes of the output signals.

7. A method according to claim 1, comprising the steps of superimposing the output signals of the sound transducers and a reference signal, applying the superimposed signals to a line of controllable light sources for energizing the light sources, recording the energized states of the light sources on a light-sensitive material, moving the light-sensitive material along first and second coordinates at a speed in the first, azimuth direction which is proportional to the speed of the ship and at a speed in the second direction which is constant during the echo reception, and returning the light-sensitive material to its original position with respect to movement in the second direction before reception of the first echo of the next impulse.

8. A method according to claim 1, wherein the step of recording includes the step of photo recording the information on photochromic material.

9. A method according to claim 1, wherein the step of recording is further defined as photo recording the information on a photographic material.

10. A method according to claim 1, wherein the step of recording is further defined as recording the phase amplitude information as holograms in such a way that the demagnification of the holograms in the asimuth direction of the target is inversely proportional to $\sqrt{R}$ where R is the distance to the target.

11. A method according to claim 10, comprising the steps of superimposing the film plane and the reconstruction plane of the holograms on a single plane with a cylindrical lens and a spherical lens and illuminating the holograms with a laser beam.

12. A method according to claim 10, comprising the steps of superimposing the reconstruction planes of the holograms at a single plane, by means of a conical lens, with the film plane, by means of a cylindrical lens, and illuminating the holograms with a laser beam.

* * * * *